United States Patent [19]

Ford

[11] 4,006,767
[45] Feb. 8, 1977

[54] PNEUMATIC TIRES
[75] Inventor: John Learned Ford, N. Canton, Ohio
[73] Assignee: The Firestone Tire & Rubber Company, Akron, Ohio
[22] Filed: Oct. 8, 1975
[21] Appl. No.: 620,514
[52] U.S. Cl. .................. 152/357 A; 152/352 R; 152/374
[51] Int. Cl.² ................ B60C 5/12; B60C 1/00
[58] Field of Search ........... 152/357 A, 354, 323, 152/327, 329, 330 R, 339, 374, 352; 428/424, 425

[56] References Cited
UNITED STATES PATENTS

| 1,698,414 | 1/1929 | Palmer | 152/352 |
| 3,208,500 | 9/1965 | Knipp et al. | 152/357 A |
| 3,833,043 | 9/1974 | Watanabe et al. | 152/357 A |
| 3,855,177 | 12/1974 | Sanda, Jr. | 152/357 A |
| 3,888,291 | 6/1975 | Herzlich et al. | 152/357 A |
| 3,936,576 | 2/1976 | Kay | 152/357 A |
| 3,939,294 | 2/1976 | Fieldhouse | 428/425 |

FOREIGN PATENTS OR APPLICATIONS 2,201,747   8/1972   Germany .................... 152/352

Primary Examiner—Drayton E. Hoffman

[57] ABSTRACT

This disclosure relates to a pnuematic tire having a rubber tread and a cast, fabricless, elastomeric body of a material having viscoelastic properties. The ratios of the structural stiffness of the mid-sidewall of the tire body to the structural stiffness of the shoulder of the tire body and the crown of the tire body, and the tire body's resulting shape, are critical to give a durable, stable, long-wearing tire. These ratios yield a tire which has acceptable growth levels in its cross-sectional dimension on inflation and service and which has the crown area of the body functionally decoupled from the sidewall area so that the crown area functions in a manner similar to the belt of a radial ply tire.

6 Claims, 2 Drawing Figures

PNEUMATIC TIRES

BACKGROUND OF THE INVENTION

This invention relates to a pneumatic tire which has a rubber tread produced from conventional tread elastomers on a cast, fabricless, body of high modulus elastomeric material. Such tires, as well as tires having high modulus elastomeric bodies and treads, are generally known. A great deal of emphasis is being placed on tires of these types in which a high modulus elastomer is molded, either by centrifugal molding, injection or transfer molding, in a tire mole without any fabric reinforcement in the body. This method is simple and low cost. It represents a significant savings in labor and equipment over the prior, laborious methods of building tire bodies which comprises laying several layers of fabric-reinforced sheets on top of one another.

A tire which is made entirely of the high modulus elastomeric material has presented service problems due to its lack of durability, road traction and relatively fast tread wear. Sudden brake application or severe cornering with these tires is particularly troublesome as it generates too much heat which gives high rates of tread wear or tread rub-off. These problems have been lessened by substituting a rubber tread for the high modulus elastomeric tread in the tire. This substitution has not necessarily solved the durability and wear problems and has caused other problems, such as adhesion between the rubber tread and the high modulus elastomeric body and excessive inflation growth due to replacing a relatively high modulus material with a relatively low modulus material.

The tire of this invention solves these problems of durability and growth and, as a result, yields better tread wear. The tire of this invention accomplishes this by a definite shape in which the structural stiffness of critical sections of the body are defined and related to each other so that the tire operates similar to the radial tire principle; that is, supple, relatively flexible sidewalls attached to, but functionally decoupled from, a more rigid belt member which is located in the tire crown under the area that contacts the road surface.

The tire of this invention has a unique cross-sectional shape for the tire body. This provides the proper relationships in the critical sections of the tire. The critical sections are the mid-sidewalls of the body, the shoulders of the body and the crown of the body. The structural stiffness of these sections must bear certain relationships to the structural stiffness of the other sections to obtain the structural geometry of the tire and the advantages of this invention. The location of these sections in relation to each other is also critical.

In the construction which contains a rubber tread, it has been determined that the presence of the rubber tread of conventional tread rubber material is not a factor in determining the ratios of these critical sections. Only the body is considered due to the fact that the rubber tread has an extremely low modulus as compared to the high modulus of the elastomeric material of the body.

In all high modulus elastomeric material tires the tread has a significant effect on the structural geometry of the tire because its modulus would be approximately equal to the modulus of the body material. More importantly, this effect would significantly change during the service life of the tire as the tread as progressively worn away thereby progressively changing the structural geometry of the tire during its life. This change, which cannot be compensated by design, is at least partially responsible for the relatively unsatisfactory commercial progress that the cast tire has heretofore attained. In the tire of this invention the structural geometry of the tire in the crown region and the mid-sidewall region is important and remains relatively unchanged during the service life of the tire since the wearing element, the rubber tread, has relatively little effect on the critical structural geometry of the tire at these locations. The structural geometry of the shoulder is changed to a greater degree, but not as much as in an all high modulus elastomeric material tire. So defined, the tire of this invention is able to retain satisfactory performance characteristics during the service life of the tire. This means the tire retains the essence of the radial tire principle during its service life, not just when it is new. This factor yields a great improvement in tread wear and durability.

It is an object of this invention to obtain a feasible, serviceable pneumatic tire having a cast body of high modulus elastomeric material and a rubber tread of conventional tread rubber material to realize the cost advantages of the cast tire systems.

It is a further object of this invention to provide a cast tire body that will not significantly change in its structural geometry during the service life of the tire.

It is a further object of this invention to provide a tire having a fabricless, cast body and a rubber tread which operates similar to the radial tire principle during its service life.

It is a further object of this invention to provide a cast tire which retains satisfactory performance characteristics during the service life of the tire.

Other objects of this invention will be evident from the entire description of this invention which follows.

SUMMARY OF THE INVENTION

The geometry of the elastomeric body of the tire is characterized by the ratios of the structural stiffness of three critical sections of the tire body (mid-sidewall, the shoulder, and the crown) and their respective locations. The thickness of the material in these sections may change from one size tire to another and when one material is used in one section and another material with different characteristics is used in other sections. These changes must always yield a structural stiffness in these sections within certain limits to obtain the satisfactory performance of the tire of this invention. This satisfactory performance is evidenced by the characteristics that the tire will not grow excessively on inflation or in service (will not become so large as to adversely affect its performance), that the tire will have good road handling with good cornering characteristics, that the tire will have satisfactory tread wear resistance and that the tire will not generate excessive heat which weakens the tire and shorten its service life.

The structural stiffness of certain sections of the tire is the characteristic of the tire to maintain its integrity when subjected to conditions of pressure, vehicle load and flexing cycles. Structural stiffness is a function of the physical properties (particularly Young's modulus) of the material used and the thickness of the material used. For this invention, it is expressed as the product of the cube of the thickness of the material in the critical section and the Young's modulus of the material at that section. The ratios of the structural stiffness in these sections are critical to obtain the structural geometry in the tire which yields the radial ply tire principle in the tire construction of this invention.

In the tire of this invention, in order to obtain the characteristics of the radial ply construction as set out above, the sidewall must be flexible, and the crown area of the body must be rigid in relation to the sidewall so that it acts similar to an inextensible belt. The tire of this invention has no belt plies which provide the inextensible belt in standard radial tires. Also, the area connecting the crown to the sidewall, the shoulder, must be flexible enough to functionally decouple the crown from the sidewall so that the radial tire principle is obtained and maintained; that is, the crown acting as an inextensible hoop (similar to a tank track) which is functionally decoupled from, but connected to, the sidewall.

The first region of critical definition is the mid-sidewall of the body. The structural stiffness of the sidewall at this point, which is defined as the point of maximum tire width when the tire is inflated, must be such that the tire will not grow excessively on inflation or during service; but it must not be too thick or resistant to flexing so as to result in excessive heat build up, poor wear, poor durability, excessive weight and the unnecessary use of critical materials. A minimum structural stiffness must be attained to prevent excessive service growth (and its resulting instability) and a maximum structural stiffness should not be exceeded so that the relatively supple nature of the sidewall, as compared to the crown, is lost.

The second critical region of the tire body is the shoulder. This region must be flexible enough to help decouple the sidewall from the relatively inextensible crown of the tire body so that the radial tire principle and concept are maintained. This region must be flexible enough to permit the tire tread to act as a flat band, relatively independent of the sidewalls, so that the band may roll relatively unrestrained on the road. The shoulder section of the body must have a minimum strength to prevent fatigue failures during service but must not exceed a maximum structural stiffness which would adversely effect the decoupling and could cause excessive heat build-up which would weaken the tire.

The third critical region is the crown of the body. This region must have enough structural stiffness to give stability and resist expansion pressures and growth in service. Its structural stiffness must be sufficient so that it functions similar to an inextensible belt, as in the radial ply structures. The minimum structural stiffness for this section of the tire must be sufficient to provide the belt-like characteristics to this region but the thickness should not be excessive which could generate excessive heat and fatigue cracks and thereby weaken the tire.

It is desired to keep the thickness of each of these critical regions to a minimum to conserve materials, decrease the possibility of cracking, cause less heat generation in the tire, and decrease the weight of the tire.

The structural stiffness of these critical sections of the tire, their ratios to each other, and their location relative to each other, are determined solely on the tire body and ignoring the rubber tread. This factor is of primary importance to this invention.

From the relationships defined above, the shoulder section of the body will have less structural stiffness than the crown section of the body. Assuming the same high modulus elastomeric material is used in these regions, this will mean that the shoulder section is thinner than the crown. This differential in thickness is best obtained by a gradual change in the form of a smooth curve or contour from the thicker crown section to the thinner shoulder section. A sharp change, as exemplified in U.S. Pat. No. 3,208,500, is not feasible as such sharp changes cause high stress points which can result in fatigue failures at the stress points.

Likewise, the structural stiffness of the mid-sidewall section will be significantly less than the structural stiffness of the crown section and somewhat less than the structural stiffness of the shoulder section. Again, this change must be accomplished by smooth curves from one section to the other. All of the changes in the structural stiffness of the tire body which have been characterized should be obtained gradually to eliminate any possible high stress areas.

For this invention, the structural stiffness at any given section is defined by the equation:

$$S = Et^3$$

In this equation the structural stiffness ($S$) is the product of the Young's modulus ($E$) of the material times the cube of the thickness ($t$) of the section. In the construction of this invention, the Young's modulus of the material in the body should be between 5,000 and 15,000 psi as measured by the secant representation at five percent strain. This modulus is required for any size tire which may be constructed under the principles of this invention.

The thickness of the body with the above properties at the crown section of the body should be between 0.3 to 0.6 inches. A thickness below this range would not give the necessary stability to the crown; a thickness above this range would yield a tire which generates excessive heat and could crack in the crown. The thickness of the mid-sidewall section should be between 0.13 and 0.3 inches. A thickness below this range in the mid-sidewall would grow excessively on inflation and in service; a thickness above this range could result in unacceptable ride and would lessen the radial tire concept. The thickness of the shoulder section should be between 0.15 and 0.50 inches. This thickness, and the resulting structural stiffness, are designed to be as small as possible, based on a stress analysis, to retain the integrity of the tire on inflation and during service. A thickness below this range could cause service and fatigue problems; a thickness above this range could cause excessive heat problems and a loss of the decoupling feature in this region.

In the tire of this invention, it is envisioned that combinations within these ranges will yield the advantages of this invention, but the advantages of this invention become greater when using levels in the middle of these ranges. It is preferred to use higher levels in the modulus range with lower levels in the thickness ranges or lower levels in the modulus range with higher levels in the thickness ranges. The advantages of this invention will be less using the low levels of both ranges together or the high level of both ranges together.

The critical factor in the tire of this invention is the ratios of the structural stiffness of the crown, shoulder and mid-sidewall sections. The structural stiffness of the crown section must be at least 4 times that of the mid-sidewall section. The structural stiffness of the shoulder section must be at least 1.5 times that of the mid-sidewall section. The structural stiffness of the shoulder section is greater than that of the mid-sidewall section and substantially less than that of the crown section. The upper levels of these ratios are restricted by the structural geometry of the tire. It must not be too stiff in any region so as to cause cracking or to lessen the radial tire principles.

The location of the sections of the tire which these ratios define are specific in the tire of this invention. The mid-sidewall section is the section of the sidewall located at the axially outermost point of the sidewall after inflation for 24 hours under standard conditions and excluding any protective side ribs, bars, or decorations. The crown section of the tire body is the section of the tire body located at the circumferential centerline of the tire when it is inflated under standard conditions. The shoulder section is the section located underneath the rubber tread between the crown and the sidewalls. It is the thinnest section in the body between the crown and the sidewalls which is underneath the rubber thread and axially inwardly of the outermost edges of the rubber tread.

It is understood that the specific thicknesses set out above are applicable to passenger size tires and that larger size tires, for example truck or tractor tires, could require greater thicknesses. However, the ratios of the structural stiffnesses and the location of the body sections, as set out above, apply to all tire sizes and types; that is to passenger, truck, tractor, airplane and off-the-road tires.

The rubber tread may be any of the known rubber compounds employed as tire treads on standard, pneumatic tires. Treads of this type may contain solution polybutadiene rubbers, emulsion or solution copolymers of styrene and butadiene, natural rubber, polyisoprene, butyl, EPDM or any combinations thereof. These compounds also contain other standard ingredients; such as, carbon black, softeners, antioxidants, accelerators and sulfur, all well known in the art.

This invention is particularly useful with treads of the type identified above. However, this invention is not limited to treads of these compositions so long as the tread has a low modulus in relation to the tire body. It is envisioned that other materials, such as low modulus polyurethane, may also be used in the tread of the tire of this invention.

The high modulus elastomeric material used for the body may be any of the known materials used to cast fabricless tires as are well known in the art. Examples of these are the polyurethanes.

DETAILED DESCRIPTION OF THE INVENTION AND DRAWINGS

Figure 1:
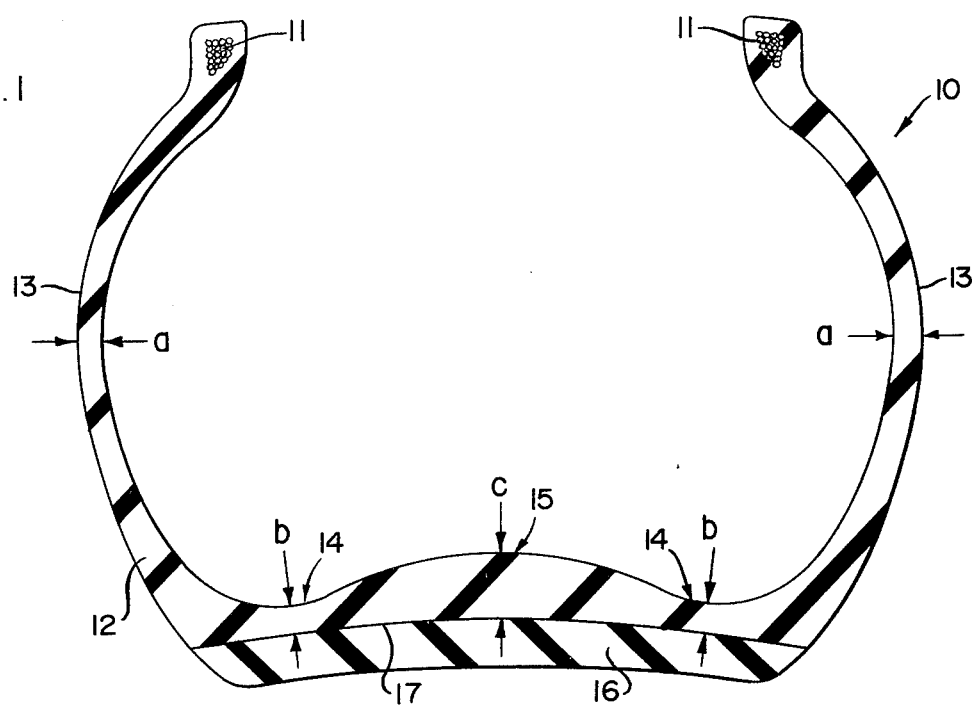
FIG. 1 is a cross-sectional view of the tire of this invention in its molded shape.
Figure 2:
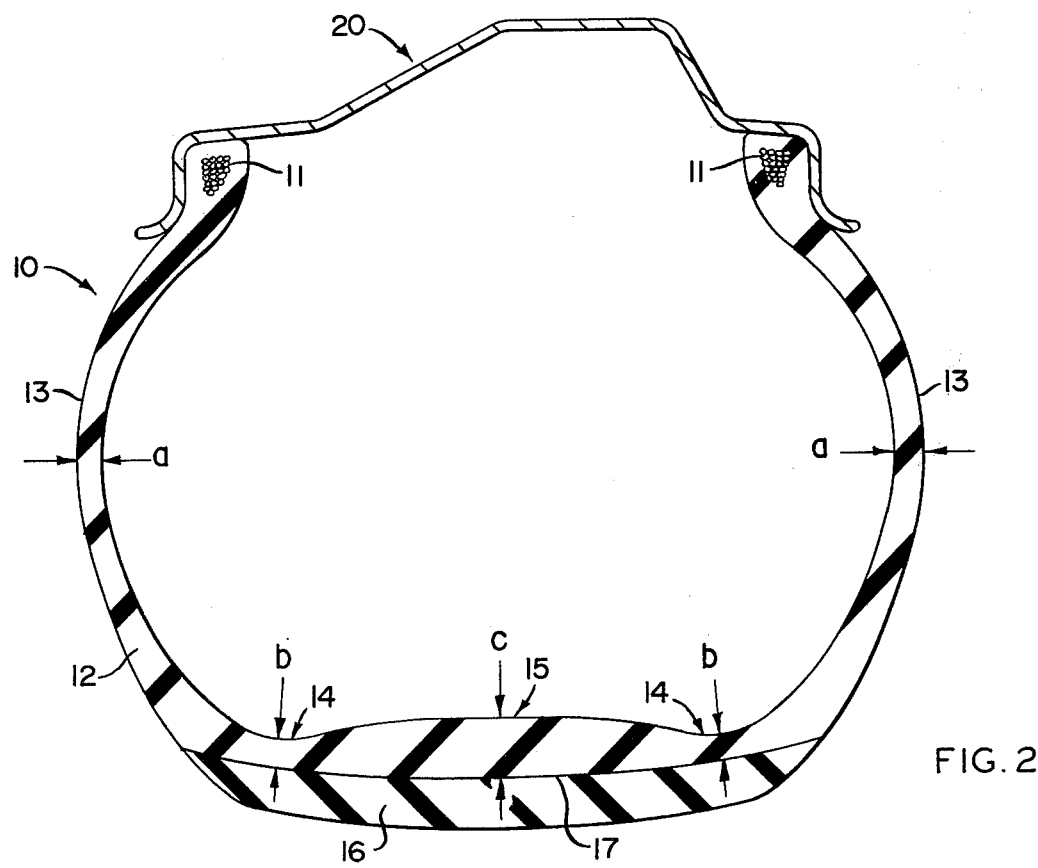
FIG. 2 is a cross-sectional view of the tire of FIG. 1 inflated under standard conditions of 24 psi inflation and after a period of 24 hours.

In FIGS. 1 and 2, the rim is shown generically as 20 and the tire is shown generically as 10 with two wire beads, 11; tire body, 12, consisting of two sidewalls, 13, two shoulder regions, 14, and the crown region, 15; and rubber tread, 16. Tread 16 is joined to body, 12, by an adhesive, applied to the interface, 17, of these two parts. The mid-sidewall section is shown as location *a*; it is located in the sidewall at the maximum inflated width of the tire as defined above. The crown section of the body is shown as location *c*; it is located at the circumferential centerline of the tire. The shoulder sections of the body are shown as location *b* at the thinnest section in the body between the crown and the sidewalls which is axially inwardly of the outermost edges of the rubber tread and underneath the rubber tread.

As the drawings demonstrate, the inner periphery of the body between these critical reference sections has a smooth contour to eliminate any potential concentration of stresses. The displacement of the crown region radially outwardly upon inflation is also demonstrated by a comparison of FIG. 2 with FIG. 1.

The rubber tread, 16, may be any of the known rubber tread compositions containing natural or synthetic rubbers, such as emulsion or solution copolymers of styrene/butadiene, solution polybutadiene, natural rubber, polyisoprene, butyl or EPDM and any combinations thereof. Specifically, a tread composition having a tensile strength of about 2500 psi, a Shore A durometer hardness of about 59, a modulus of about 950 psi at 300% elongation, an elongation at break of about 600% and a hysteresis value of 40% as measured on a ball rebound test at room temperature is satisfactory. This specific composition is basically a solution styrene/butadiene copolymer with the standard compounding ingredients, such as reinforcing carbon black, sulfur, accelerators and the like, as is well known in the art.

The material utilized in the body of the tire may be any of the known high modulus viscoelastic materials which have been recommended for use in fabricless, cast tires. Preferably polyurethane rubbers, particularly the type disclosed in U.S. Pat. No. Re. 28,424, are utilized as the material for the body of the tire of this invention.

Preferably the polyurethane elastomer should have a tensile strength at 212° F. equal to or reater than 1,800 psi, a crescent tear strength at 212° equal to or greater than 200 psi, a De Mattia flex life at 176° F. equal to or greater than 200,000 cycles; and at ambient temperature, a tensile strength equal to or greater than 2,800 psi, an elongation equal to or greater than 400% and a Young's modulus of between 5,000 and 15,000 psi. This elastomer should have a molecular weight of 800 to 5,000 between the electrostatic cross-links and a molecular weight of 5,100 to 40,000 between the covalent cross-links.

It is understood that the viscoelastic properties of the body material should not permit excessive creep. Creep is an increase in elongation of the material as a function of time for a given load. The creep of the material is correlated to the reduction of the stress with time at a constant elongation. A material which has an excessive reduction of the stress with time is found to exhibit unacceptable tire growth in service over a period of time.

The polyurethane elastomer as described above will exhibit acceptable creep during the normal service life of the tire. Materials which exhibit creep significantly greater than that of the described material would be expected to have unacceptable growth if used for a cast tire body.

The Applicant has successfully manufactured and tested tires containing the features of this invention. In a 165–13 size, the tire of this invention had the following molded dimensions:

The nominal bead diameter was 13 inches, the section height at the shoulder was 5.2 inches, the section height at the tread centerline was 5.07 inches, the maximum section width was 6.75 inches, the thickness of the rubber tread was 0.38 inches at the tread centerline, the thickness of the mid-sidewall section (location *a* of the figure) was 0.16 inches, the thickness of the crown section of the body (location *c* in the figure) was .5 inches, the thickness of the shoulder (location *b* in the figure) was 0.24 inches.

The inflated dimensions of this tire on a 4 inch rim at 24 psi were:

The nominal bead diameter was 13 inches, the section height at the tread centerline was 5.4 inches, the maximum section width was 6.25 inches, the thickness of the rubber tread at the tread centerline was 0.4 inches, the thickness of the mid-sidewall section (location *a* of the figure) was 0.16 inches, the thickness of the crown section of the body (location *c* in the figure) was 0.47 inches, the thickness of the shoulder (location *b* in the figure) was 0.22 inches.

The tread contained standard circumferential grooves having an average mold depth of 0.312 inches.

The rubber tread composition utilized in this tire contained a solution copolymer of styrene and butadiene, reinforcing carbon black, softener, antioxidant, sulfur and curing accelerators. The modulus at 300% elongation of this compound was 950 psi.

A polyurethane base adhesive was used at the interface between the tire body and the rubber tread.

The tire body was comprised of a polyurethane polymer having 6.35% NCO. The Young's modulus of this material was 9,600 psi. At 212° F. its tensile strength was 2560 psi. Its crescent tear strength was 345 psi; at ambient temperature its tensile strength was 4900 psi, and its elongation was 550% at break.

Based on the above figures, the structural stiffness of the crown section was 25 times that of the mid-sidewall section and that of the shoulder section was 2.6 times that of the mid-sidewall section.

The above-described 165–13 tire was tested under standard conditions described below which are commonly utilized to test standard pneumatic tires. On these tests tires of this invention have yielded wear ratings up to 120 miles per mil. This projected to a potential mileage in excess of 30,000 miles. The miles per mil attained with larger cast tires of the prior art on similar tests were in the 45 to 60 miles per mil range. The tire of this invention has demonstrated an improvement in the range of 100% for tread wear on certain tests.

In one of the tests summarized above, the tires were run fifty percent of the time on the highway at 55 MPH, and fifty percent of the time on a test track at 70 MPH. The tires were rotated from front to rear each 1000 miles. The load on each tire was 860 psi and the inflation pressure was 24 psi. At the end of 22,000 miles, one tire was removed due to tread cracking. The miles per mil and estimated non-skid mileage to the top of the wear indicator in the fastest wearing groove of the tread are reported in Table I. Tire 2 was run to 39,000 miles under the same conditions to observe its endurance qualities. It was removed with no failure at this mileage. Table I reports its rating at this mileage.

TABLE I

| Tire | Actual Mileage | Estimated Non-Skid Mileage | Miles per Mil |
|---|---|---|---|
| 1 | 23,000 | 25,936 | 97 |
| 2 | 24,000 | 29,308 | 110 |
| 2 | 39,000 | 31,800 | 120 |

A similar test on the same tires showed comparable results. These tires were run one hundred percent of the time on the highway at 55 MPH with 810 psi load on the front tires and 715 psi load on the rear tires, both at 20 psi inflation. The tires were held in position. One of the tires was removed at 22,000 miles, due to tread cracks and wear. Using the same measurements as defined for Table I, Table II reports the date for these tires. Again, the remaining tires were run to higher mileages to evaluate tire body endurance. Two tires were removed at 38,000 with no failure; another was removed at 28,923 miles, due to injury when run underinflated. Table II also reports this data.

TABLE II

| Tire | Position | Actual Mileage | Estimated Non-Skid Mileage | Miles per Mil |
|---|---|---|---|---|
| 1 | RR | 21,921 | 28,708 | 111 |
| 2 | LR | 22,000 | 30,681 | 118 |
| 3 | RF | 22,000 | 19,407 | 70 |
| 4 | LF | 22,000 | 34,266 | 133 |
| 1 | RR | 28,923 | 27,333 | 105 |
| 2 | LR | 38,000 | 33,121 | 128 |
| 4 | LF | 38,000 | 32,552 | 126 |

Tires identical to the ones identified above were evaluated on an indoor test wheel against a standard, commercial steel-belted radial tire for dynamic characteristics. The characteristics evaluated were cornering force, rolling resistance and self-aligning torque. These tires, as reflected by the data set out in Table III, performed to acceptable commercial levels on these tests and compared very well with a commercial, steel-belted radial tire. The tires were tested on a ten foot diameter indoor test drum run at 20 MPH with each tire having 690 pounds load on it and inflated to 24 psi.

TABLE III

| | Cornering Force (lbs.) | | | | Self-Aligning Torque (ft.lbs.) | | | | Rolling Resistanc (lbs.) |
|---|---|---|---|---|---|---|---|---|---|
| Slip Angle | 1° | 2° | 3° | 4° | 1° | 2° | 3° | 4° | 0° |
| Tire of Invention | 96 | 185 | 245 | 300 | 9 | 12 | 13 | 12 | 10.3 |
| Commercial Steel-Belted Radial | 107 | 197 | 277 | 339 | 10 | 13 | 14 | 13 | 12.7 |

The rolling resistance of the cast tire of this invention is approximately 20% better than the steel-belted radial. The self-aligning torque of the tire of this invention is comparable to the steel-belted radial and the cornering force of the tire of this invention, although somewhat under the steel-belted radial, is at an acceptable commercial level.

I claim:

1. A cordless, pneumatic tire comprising an annular, rubber tread and a cast body of viscoelastic material having a Young's modulus of between 5,000 and 15,000 psi, said body having an annular crown region located between two annular shoulder regions and sidewall regions connecting the outer edges of said shoulder regions to tire beads, said crown and shoulder regions located underneath said rubber tread and axially inwardly of the outermost edges of said rubber tread, said crown region having a crown section measured at the circumferential centerline of the tire, each said shoulder region having a shoulder section measured at the thinnest point of said shoulder region and each said sidewall region having a mid-sidewall section measured at the maximum axial width of the sidewall on standard inflation, said crown section having a structural stiffness at least 4 times the structural stiffness of said mid-sidewall section and said shoulder section having a structural stiffness at least 1.5 times the structural stiffness of said mid-sidewall section, said structural stiffness of said crown being substantially greater than said structural stiffness of said shoulder section.

2. The tire of claim 1 wherein the inner periphery of said body has a gradually changing contour from one section thereof to the other sections thereof.

3. The tire of claim 1 wherein said viscoelastic material is a polyurethane polymer.

4. The tire of claim 3 wherein said polyurethane has a Young's modulus of about 9,600 psi.

5. The tire of claim 1 wherein the thickness of said crown section of said body is between 0.3 and 0.6 inches, the thickness of said shoulder sections of said body is between 0.15 and 0.5 inches and the thickness of said mid-sidewall sections of said body is between 0.13 and 0.3 inches.

6. A cordless, pneumatic tire comprising an annular, rubber tread and a cast body of a polyurethane polymer having a Young's modulus of about 9,600 psi, said body having an annular crown region located between two annular shoulder regions and sidewall regions connecting the outer edges of said shoulder regions to tire beads, said crown region and shoulder regions located underneath said rubber tread and axially inwardly of the outermost edges of said rubber tread, said crown region having a crown section measured at the circumferential centerline of the tire, each said shoulder region having a shoulder section measured at the thinnest point of said shoulder region, and each said sidewall region having a mid-sidewall section measured at the maximum axial width of the sidewall on standard inflation, said crown section having a structural stiffness about 25 times the structural stiffness of said mid-sidewall section and said shoulder section having a structural stiffness about 2.6 times the structural stiffness of said mid-sidewall section.

* * * * *